United States Patent [19]

Taborský

[11] 4,064,836
[45] Dec. 27, 1977

[54] AQUATIC TANK

[76] Inventor: Jiří Taborský, R.R. No. 1, Box 430 D-2, Palmetto, Fla. 33561

[21] Appl. No.: 709,968

[22] Filed: July 30, 1976

[51] Int. Cl.² ............................................ A01K 63/00
[52] U.S. Cl. ................................................... 119/3
[58] Field of Search ......................... 119/3, 5; 43/55; 4/172.19

[56] References Cited

U.S. PATENT DOCUMENTS

| | | | |
|---|---|---|---|
| 2,580,942 | 1/1952 | Murad et al. | 4/172.19 |
| 2,795,889 | 6/1957 | Garland | 43/55 |
| 2,939,153 | 6/1960 | Arnold et al. | 4/172.19 |
| 3,653,358 | 4/1972 | Fremont | 119/3 |

Primary Examiner—Hugh R. Chamblee
Attorney, Agent, or Firm—Stein & Frijouf

[57] ABSTRACT

An aquatic tank is disclosed comprising a frame-like base which may be formed from a one piece continuous or open loop member configured into a predetermined shape and designed to support a flexible tank therefrom. The tank may include a single layer having its upper peripheral edge connected in sealing engagement to the frame, or alternately, the tank may be formed from two layers arranged in spaced relation to one another. The two layers are joined to the frame by a portion of the material itself which is folded over the frame to define the open top of the tank.

4 Claims, 4 Drawing Figures

U.S. Patent    Dec. 27, 1977    4,064,836
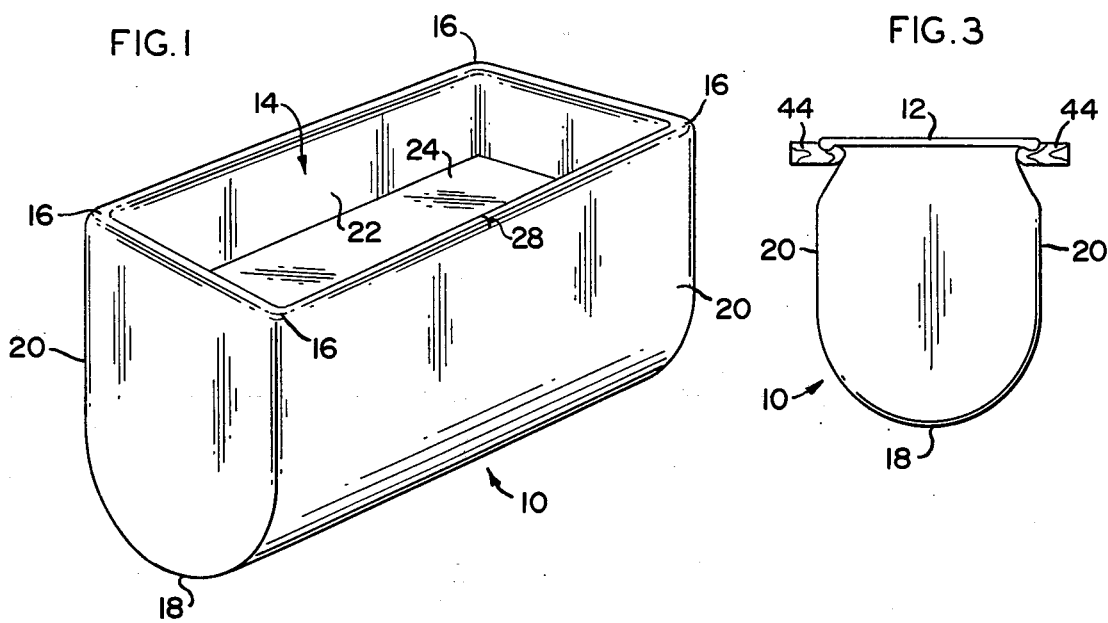
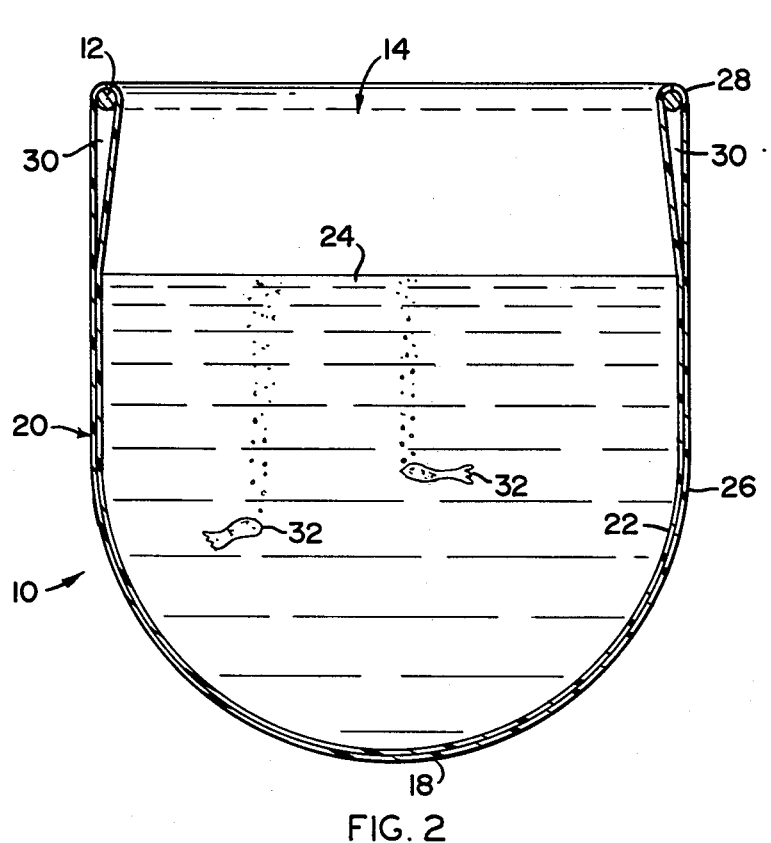

AQUATIC TANK

BACKGROUND OF THE INVENTION

1. Field of the Invention

This invention relates to a container in the form of an open top aquatic tank designed to hold marine life or the like of the type primarily designed for temporary breeding tanks and including the tank means being in the form of a flexible material.

2. Description of the Prior Art

Various aquatic type tanks used to hold water, liquid, and of course, marine life, have been well known for many years. With the increase in popularity of the general public for growing and keeping tropical type fish, a wide variety of aquatic tanks have been designed and are presently on the market. In addition, the fish industry has had to increase and improve its facilities for keeping fish due to the increased demand for such fish by the public.

Aquatic tanks are commonly used not only for the keeping of tropical fish for aesthetic purposes, but also for the handling, breeding and transporting of fish. Therefore, tanks used for various purposes are in demand in the fish raising industry. While there are a number of tanks having various designs to accomplish specific purposes and while the various aquatic tanks available are of generally similar, rather simple structure, there is a need in industry for an all-purpose tank capable of having sufficient versatility by means of its adaptable structure to solve the needs of the industry.

Such a tank should be of simple structure, inexpensive to manufacture and have a long durable life. The structure of such a tank, while incorporating all of these features, should further provide versatility of use to the extent that such a tank is desirable for use as a main housing tank, a breeding tank, or a transporting tank, depending upon the immediate need of the user. Many of the tanks presently available in the prior art simply cannot meet all of these various needs because of their rigid design which dictates an overly complicated structural assembly. Such assemblies are generally permanent in nature in the sense that the tanks cannot be easily disassembled for storage or for transportation.

SUMMARY OF THE INVENTION

This invention relates to an aquatic tank designed primarily to hold marine life of various types. More specifically, the structure includes a base which may be in the form of a frame. The frame is formed from a one piece rod or tubular structure having a plurality of bends or folds therein to define the frame into a particular "closed" configuration. The rod or tube which forms the frame can comprise a closed loop arrangement whereby the rod is continuously formed, having no space which define the extremity of the rod. Alternately, the rod or tube may have opposite extremities defined thereon and positioned in spaced relation to one another. The open or non-continuous rod thereby defines an opening by the adjacent, spaced position of its extremities. This opening can be utilized to mount the tank means in supported relation thereon.

The tank means comprises a bag-like arrangement having a base and side wall integrally formed to one another and made from a flexible material. The flexible material itself can be made from a plastic material and may be transparent, translucent, or opaque.

The tank means itself is joined to the frame along its upper peripheral edge which defines, along with the frame, the open top of the aquatic tank structure. The tank means may be formed from a single layer of flexible material and be joined to the frame by folding over the upper peripheral portion. The actual attachment to the frame of its upper peripheral portion may be accomplished by attaching the peripheral edge to the side wall of the material itself by any applicable means such as adhesion, stitching, or conventional fastening devices. When the single layer bag member which forms the tank means is produced, the peripheral channel formed by folding over the peripheral portion of the bag member may be formed at this time. In this embodiment of the present invention, an aperture is formed in this channel for fastening or connecting the channel about the frame. This particular embodiment is used with the non-continuous loop so that the channel may merely be slid over the rod member by passing through the space in the rod. Alternately, the bag member may be formed from a double layer. In this embodiment of the present invention, a closed loop may serve as the frame. Attachment of the bag member which forms the tank means to the frame occurs by forming an aperture in the bag member, fitting the frame on the bag member interior, and then folding or passing one side wall of the bag member through the frame whereby the channel is formed by the fold portion integrally connecting the inner and outer layers relative to the frame. In this embodiment of the present invention, the rod or tube may be continuous in nature and the spacing or open portion of the rod defined by extremities of the rod may be eliminated.

Regardless of the various embodiments utilized, the structure may be readily broken down or disassembled simply by removing the flexible bag which forms the tank means from the frame. Storage and/or shipment of the aquatic tank structure is made more efficient by the act of temporary and/or separately storing or folding the flexible bag from the frame. In addition, the size or capacity of the tank may be varied simply by attaching a bag member to a frame whereby the bag member has larger dimensions.

The invention accordingly comprises an article of manufacture possessing the features, properties and the relation of elements which will be exemplified in the articles hereinafter described, and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which:

FIG. 1 is a perspective view of the aquatic tank of the present invention utilizing a flexible tank means.

FIG. 2 is a sectional view showing the tank means comprising a plurality of layers defining the side wall and base of the tank means.

FIG. 3 is an end view showing means to mount the aquatic tank.

FIG. 4 is a partial sectional view showing the frame member, and means of mounting a single layered tank means thereon and further an initial embodiment of connecting the aquatic tank to a supporting device.

Similar reference characters refer to similar parts throughout the several views of the drawing.

DETAILED DESCRIPTION

This invention relates to an aquatic tank generally indicated in FIGS. 1 and 2 as 10. The tank includes a base means in the form of frame 12 which may be defined by a rod or tubular structure defining the open portion 14 of the tank. As shown in FIG. 1, the rod or frame 12 may have a plurality of bends 16 formed therein to arrange the frame in the desired configuration. As will be fully explained hereinafter, the rod 12 may be either a continuous substantially annular shaped structure or alternately have an opening defined by the spaced apart extremities of the rod. When the non-continuous rod is used as a frame (see FIG. 4) the extremity thereof defines a space through which a portion of the tank means may pass and thereby be mounted on the rod. Furthermore, in this embodiment of the invention the peripheral connecting channel, to be described hereinafter, may be already formed. When the continuous rod is used for the frame, forming or defining of the peripheral connecting channel is accomplished after attachment to the frame itself.

Turning to FIG. 2, the tank means may comprise a bottom portion 18 integrally formed to side wall members 20. As previously explained, the upper peripheral edge of the side walls terminate and thereby define the open top 14 of the tank means. In the embodiments shown in FIG. 2, the base and integrally formed side walls comprise a double layer of flexible material wherein the inner layer 22 only is in contact with the liquid 24 which the tank is designed to hold. The outer layer 26 of the tank means may be in movable engagement with the inner layer as shown in FIG. 2 or may be arranged in spaced relation thereto for various purposes including insulation and to enhance the design. The peripheral channel 30 which at least partially surrounds frame rod 12 may be formed by merely arranging the rod 12 between layers 22 and 26 and folding layer 22 on the "inside" of the frame as shown in FIG. 2 and allowing the outer layer 26 to remain on the "exterior" of the frame as shown in FIG. 2. This arrangement can be accomplished by merely integrally connecting layers 22 and 26 together to form a bag-like structure with a single opening 28 through which may pass the frame 12. Once on the interior of this "bag structure" the layers 22 and 26 are arranged as set forth above to produce the tank means as shown in FIG. 2. Naturally, any desired liquid 24 may be placed within the tank, dependent upon the marine life 32 or other objects designed to be contained within the tank.

Turning to FIG. 4, another embodiment of the tank means comprises the base and side walls including a single layer 34 of flexible material wherein the opening 14 again is defined at the upper peripheral edge of the side wall 34. The connecting peripheral channel 38 is defined by folding peripheral portion 40 over rod 12 and securing it in any conventional manner to the surface of layer 34 as shown.

Mounting or positioning of the tank means 10 is accomplished in a number of ways. Due to the flexibility of the tank means, any type of supporting surface, such as the edge of two tables or supporting boards 44 may be arranged to engage the under portion of rod 12 in such a manner that the flexibility of the side wall of the tank allows it to give, thereby arranging the frame 12 in the manner shown in FIG. 3 which allows the entire aquatic tank to be supported as shown.

As shown in FIG. 4, another means of more permanently securing the tank in a given location is to provide a strap means 50 which may be made of either flexible or rigid material so as to be configured into substantially an L-shaped configuration as shown in FIG. 4. This strap is secured to a supporting surface 46 by means of a conventional connector 52 which may pass and be secured in supporting means through an aperture or like means 54 within the strap 50.

It will thus be seen that the objects set forth above among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It will be understood that the following claims are intended to cover all of the generic and specific features of the invention herein described, and all statements of the scope of the invention which, as a matter of language, might be said to fall therebetween.

Now that the invention has been described, what I claim is:

1. An aquatic tank of the type primarily designed to hold marine life therein; comprising in combination:
    a frame having a first and a second frame end established adjacent one another with the perimeter of said frame defining a substantially closed frame area;
    flexible tank means formed in the shape of a closed bag having a first and a second bag end;
    entrance means in said flexible tank means for enabling insertion of said frame into the interior of said tank means,
    said first bag end adapted to extend through said closed frame area to coact with said second bag end for forming a two layer aquatic tank with the opening of said aquatic tank being defined by said perimeter of said frame; and
    support means adapted for cooperation with said frame to support the aquatic tank relative thereto.

2. An aquatic tank as set forth in claim 1, wherein said entrance means is established substantially equidistant from the terminations of said first and second end.

3. An aquatic device as set forth in claim 1, wherein said frame means includes an integral rod having a substantially circular cross-section.

4. An aquatic device as set forth in claim 1, including interconnecting means adapted for engaging each of said first and second frame ends, whereby said interconnecting means may be removed from said frame ends for mounting said flexible tank on said frame.

* * * * *